United States Patent
Ayirala et al.

(10) Patent No.: US 11,668,171 B2
(45) Date of Patent: Jun. 6, 2023

(54) METHODOLOGY TO INCREASE OIL PRODUCTION RATES IN GRAVITY DRAINAGE CO2 GAS INJECTION PROCESSES

(71) Applicant: SAUDI ARABIAN OIL COMPANY, Dhahran (SA)

(72) Inventors: Subhash Ayirala, Dhahran (SA); Zuhair AlYousef, Saihat (SA); Dong Kyu Cha, Dhahran (SA); Muhammad Almajid, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/463,005

(22) Filed: Aug. 31, 2021

(65) Prior Publication Data
US 2023/0064753 A1    Mar. 2, 2023

(51) Int. Cl.
*E21B 43/16* (2006.01)
*C09K 8/594* (2006.01)
*E21B 43/22* (2006.01)

(52) U.S. Cl.
CPC ............ *E21B 43/164* (2013.01); *C09K 8/594* (2013.01)

(58) Field of Classification Search
CPC ........ C09K 8/594; C09K 8/584; C09K 8/588; C09K 8/703; C09K 8/94; E21B 43/164; E21B 43/26; E21B 43/166
See application file for complete search history.

(56) References Cited

U.S. PATENT DOCUMENTS

| | | | |
|---|---|---|---|
| 4,856,589 | A | 8/1989 | Kuhlman et al. |
| 4,921,576 | A | 5/1990 | Hurd |
| 5,267,615 | A | 12/1993 | Christiansen et al. |
| 5,465,790 | A | 11/1995 | McClure et al. |
| 5,778,977 | A | 7/1998 | Bowzer et al. |

(Continued)

FOREIGN PATENT DOCUMENTS

| | | | | |
|---|---|---|---|---|
| AU | 2007309735 B2 | * | 12/2011 | ............... B32B 1/08 |
| CN | 102337874 A | | 2/2012 | |

(Continued)

OTHER PUBLICATIONS

Farajzadeh et al.; "Effect of Gas Permeability and Solubility on Foam"; Journal of Soft Matter; Nov. 30, 2014 (8 pages).

(Continued)

*Primary Examiner* — Zakiya W Bates
(74) *Attorney, Agent, or Firm* — Osha Bergman Watanabe & Burton LLP

(57) ABSTRACT

Described is a method for treating hydrocarbons in a reservoir. A foaming surfactant solution and a foaming gas are introduced into the upper portion of a reservoir such that barrier foam bubbles form. Then, super/critical carbon dioxide is introduced such that a CO2 cap forms. The CO2 cap is formed above a foam barrier of aggregated barrier foam bubbles positioned at an interface between hydrocarbons to be treated in the reservoir and the CO2 cap. The super/critical carbon dioxide is introduced into the reservoir at an injection rate that is greater than a pre-treatment critical gas injection rate. Hydrocarbons are recovered from a lower portion of the reservoir.

18 Claims, 5 Drawing Sheets

(56) References Cited

U.S. PATENT DOCUMENTS

2012/0247764 A1* 10/2012 Panga ............... E21B 43/267
                                                    166/280.2
2015/0345268 A1   12/2015 Bryant et al.
2017/0107422 A1    4/2017 Hou et al.
2017/0370196 A1   12/2017 Myhr

FOREIGN PATENT DOCUMENTS

| CN | 105952425 A   | 9/2016  |
|----|---------------|---------|
| FR | 2495218 A1    | 6/1982  |
| RU | 2736021 C1    | 11/2020 |
| WO | 2015178899 A1 | 11/2015 |

OTHER PUBLICATIONS

Rao et al.; "Development of Gas Assisted Gravity Drainage (GAGD) Process for Improved Light Oil Recovery"; SPE 89357; Society of Petroleum Engineers; Apr. 2014 (12 pages).

Kasiri, N. and Bashiri, A.; "Gas-Assisted Gravity Drainage (GAGD) Process for Improved Oil Recovery"; IPTC 13244; International Petroleum Technology Conference; Dec. 2009 (7 pages).

Akhlaghi et al.; "Gas Assisted Gravity Drainage by CO2 Injection"; Energy Sources, Part A: Recovery, Utilization, and Environmental Effects; vol. 34; Issue 17; Jul. 9, 2012; pp. 1619-1627 (9 pages).

* cited by examiner

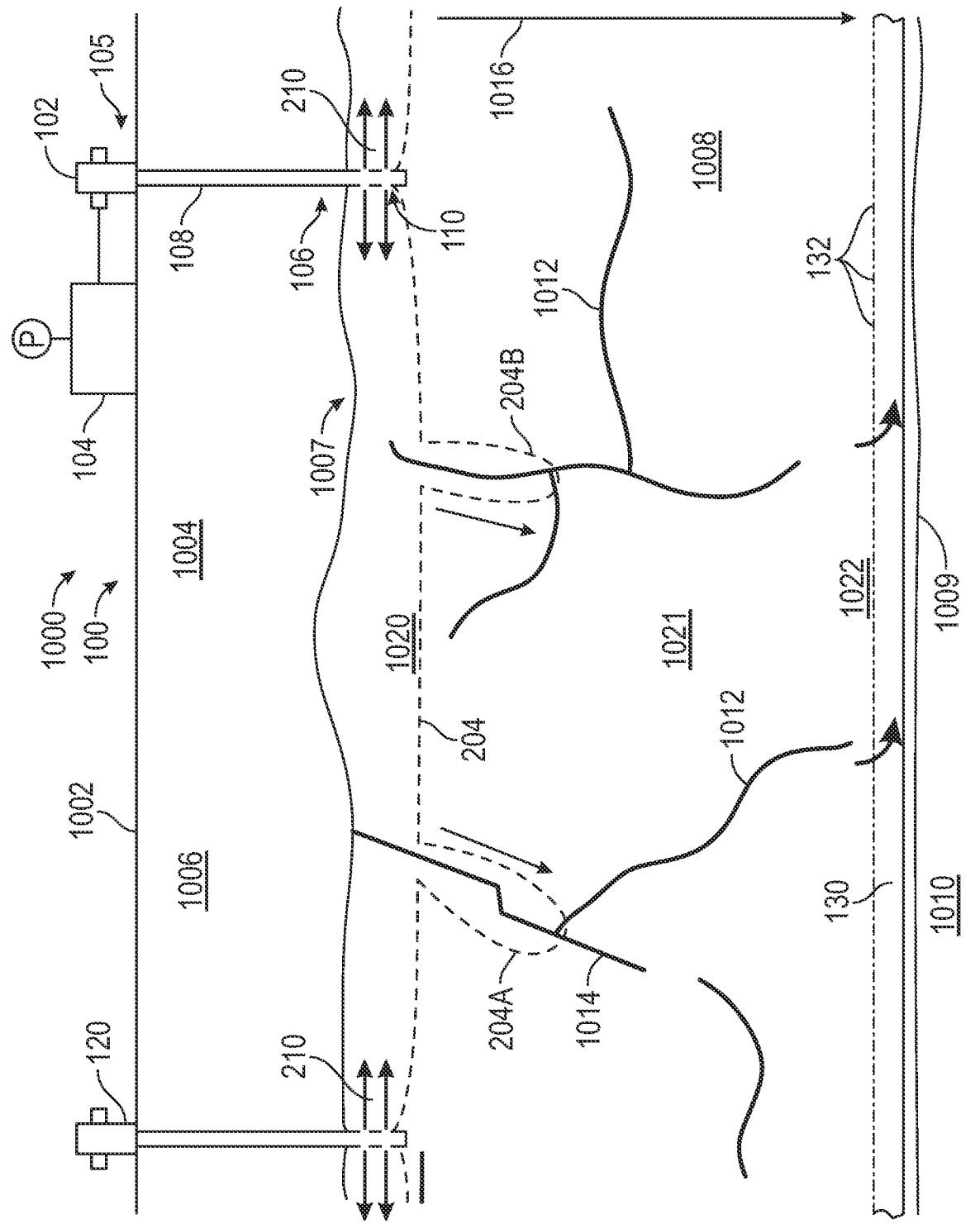

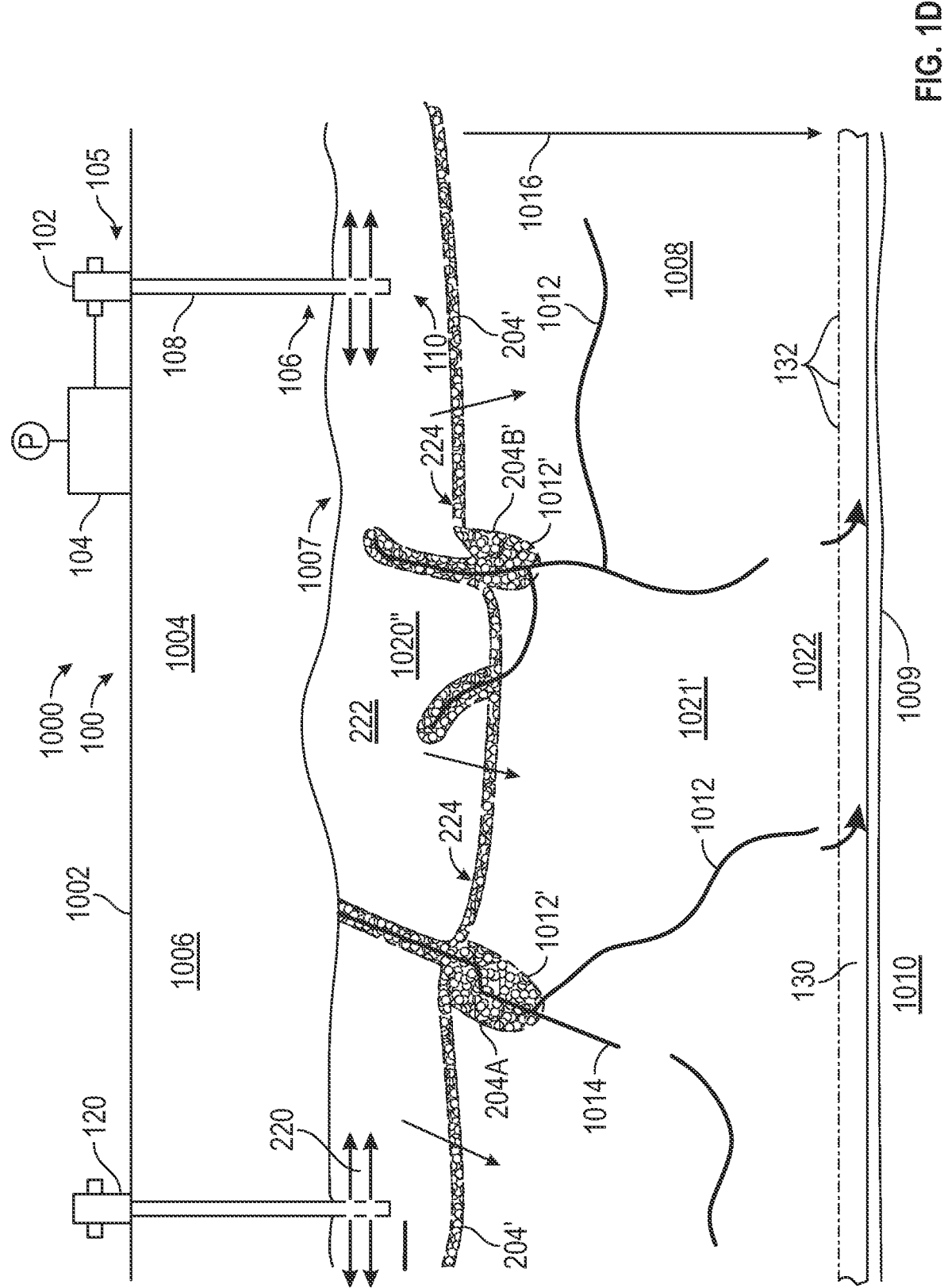

METHODOLOGY TO INCREASE OIL PRODUCTION RATES IN GRAVITY DRAINAGE CO2 GAS INJECTION PROCESSES

BACKGROUND

A gravity drainage/CO2 (carbon dioxide) injection process is used for tertiary oil recovery in dipping-type reservoirs (also known as hydrocarbon-bearing formations). This technique may also be useful for horizontal-type reservoirs. Gravity drainage/CO2 injection is a top-down oriented process. Carbon dioxide is introduced at the top of a reservoir using an injection well to form a gas updip. A recovery or production wellbore is positioned with perforations proximate to the bottom of the reservoir to collect hydrocarbons produced.

CO2 at super/critical conditions ("super/critical" means at or greater than the critical point temperature and pressure) is used for its favorable phase behavior characteristics with crude oil means, such as swelling, viscosity reduction, and reduced fluid-crude oil interfacial tension versus other fluids, such as methane or water. At super/critical conditions, CO2 has miscibility that results in near-zero gas-oil interfacial tension with crude oil. The relative miniscule interfacial tension effectively mobilizes residual, heavy, and highly-polar portions of crude oil in the treated portions of the reservoir. Mobilized, the crude oil flows downward in the reservoir towards the recovery wellbore. Such crude oil drainage occurs through a combination of both film flow, caused by interaction with and absorption of some of the super/critical CO2, and gravity drainage.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

A method for treating hydrocarbons in a reservoir may include the step of introducing a foaming surfactant solution into an upper portion of a reservoir. The foaming surfactant solution includes an aqueous solution and a foaming surfactant. The method may also include the step of introducing a foaming gas into the upper portion of a reservoir. The foaming gas is introduced such that the surfactant solution and the foaming gas intimately intermingle and form barrier foam bubbles in the upper portion of the reservoir. The method also may include the step of introducing a super/critical carbon dioxide into the reservoir. The super/critical carbon dioxide is introduced at an injection rate that is greater than a pre-treatment critical gas injection rate for the reservoir. The introduction is such that a CO2 cap forms above a foam barrier. The foam barrier is positioned at an interface between the hydrocarbons to be treated in the reservoir and the CO2 cap. The foam barrier comprises aggregated barrier foam bubbles. The method may also include the step of recovering recovering hydrocarbons from a lower portion of the reservoir.

Other aspects and advantages of the claimed subject matter will be apparent from the following description and the appended claims.

BRIEF DESCRIPTION OF DRAWINGS

This section describes specific embodiments in detail with reference to the accompanying figures. Where the figures include like elements between them, they are denoted by like reference numerals. They may also be differentiated by letters appended to reference numerals. The use of the prime or """ mark with a numeral may indicate a like element in a different state of operation or condition than previously referenced; however, other aspects remain the same.

FIG. 1B is a diagram that illustrates a well environment during initial treatment in accordance with one or more embodiments.

FIG. 1D is a diagram that illustrates a well environment during CO2 treatment in accordance with one or more embodiments.

Figure 1A:
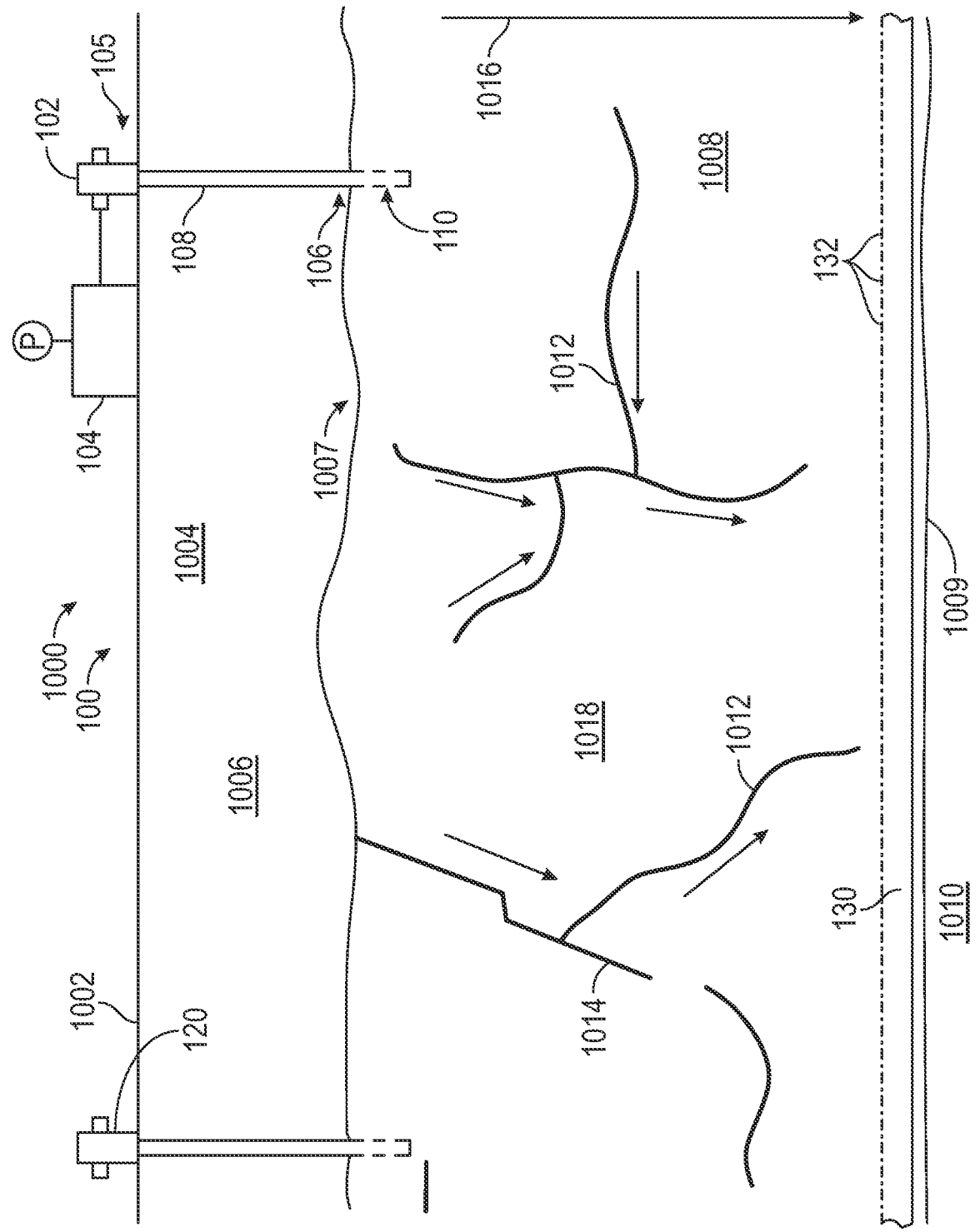
FIG. 1A is a diagram that illustrates a well environment with a treatment system in accordance with one or more embodiments.

Typically, down is toward or at the bottom and up is toward or at the top of the figure. "Up", "upward", "down", and "downward", are oriented relative to a local vertical direction.

DETAILED DESCRIPTION

The critical gas injection rate value is an important operational parameter for the combined gravity drainage/CO2 injection process. The "critical gas injection rate value" reflects the maximum flow rate that carbon dioxide may be injected into a reservoir without creating breakthrough across a carbon dioxide/crude oil front or interface. Traditionally, introducing carbon dioxide into a reservoir at a greater rate than the critical gas injection rate value results in premature breakthrough of injected CO2 towards the bottom producer. Such bypassing of non- or undertreated portions of the formation results in reduced sweep efficiency During treatment, the CO2 gas/oil interface moves downward towards a recovery wellbore with perforations positioned near the bottom of the reservoir. It is desirable to keep a stable interface between the crude oil and the treatment carbon dioxide to prevent breakthrough of the CO2 through the crude oil. Such breakthrough is referred to in the enhanced oil recovery (EOR) arts as "fingering" or "viscous fingering". Because of differences in the viscosity between crude oil and carbon dioxide, with too much fluid flow or pressure the carbon dioxide may "push" crude oil aside and create "fingers" of carbon dioxide in the formation. These fingers may reach from the point of introduction towards the point of recovery, bypassing other areas of the formation that have not been treated. This may lead to premature breakthrough of CO2 at the recovery wellbore, resulting in wasted injection fluid. After breakthrough, if the situation is not mitigated, a greater injection fluid flow rate will be required to maintain pressure in the reservoir and to provide any hope of treatment to the non-treated portions of the wellbore as the injection fluid will "blow through" the previously treated portion of the formation via the flow path created by the viscous fingering.

To prevent viscous fingering in a homogenous reservoir, the carbon dioxide injection rate is maintained at less than the critical gas injection rate value. The same amount of carbon dioxide displaces a similar amount of crude oil produced. In doing so, the CO2/crude oil interface advances downward and evenly. The combined forces of mobilization due to exposure to CO2, gravity, and an amount of force applied by the CO2 at the CO2/crude oil interface causes CO2 to replace the produced crude oil. The balanced crude oil production should result in preventing treatment fluid bypass of the CO2/crude oil interface and an even treatment of the formation at an introduction rate of the CO2 fluid that is less than the critical gas injection rate value.

However, formations are rarely homogenous. Heterogeneity of reservoirs may manifest in several ways, including streaks of discontinuous formation composition, including highly-porous zones, intrusions, faults, and fractures. Even wide variations within an otherwise homogeneous formation in porosity and permeability of the pore structure may make a reservoir behave as if it was heterogeneous in structure. Maintaining a steady relationship between CO2 introduction and crude oil production to maintain a smooth CO2/crude oil interface and treatment of the reservoir is almost impossible when encountering such areas of discontinuity and high conductivity zones. Although physical anomalies are predicable in occurrence, they are unpredictable in location or form.

A useful method of treating a formation would not only permit increase of the carbon dioxide introduction rate value up to but also beyond the critical injection gas rate value, where viscosity differences of the treatment fluid and the crude oil is a non-factor and viscous fingering is prevented. In addition, the method of treatment should also be able to mitigate the heterogeneously of the reservoir being treated—to prevent any structural bypass of the treatment fluid regardless of the carbon dioxide injection rate. In such a treatment, the crude oil production rate and the sweep effectiveness of the treatment will both increase, leading to not only greater production rates but also better recovery from the reservoir.

The introduction of a surfactant solution and foaming gas in the reservoir forms barrier foam bubbles in situ. The in situ formation of the barrier foam bubbles occurs near the upper portion of the reservoir. As the barrier foam bubbles settle at the CO2/crude oil interface or in a high-conductivity channel, a foam barrier forms by the coupling of barrier foam bubbles. The foam barrier separates the carbon dioxide from the crude oil physically into a foam barrier. The stable foam barrier prevents the carbon dioxide above the CO2/crude oil interface from breaking through, thereby preventing viscous fingering. As well, the barrier foam bubbles and portions of the foam barrier may be swept into high-conductivity zones that may be present in even a homogenous reservoir, thereby blocking them. By clogging up such pathways with a foam barrier, carbon dioxide above and up channel of the foam barrier has no way to bypass the CO2/crude oil interface towards the recovery well. This configuration permits treatment of the reservoir as if it were more homogenous because as the heterogeneous aspects are mitigated.

The foam barrier is stable in the combined gravity drainage/CO2 injection process for several reasons. The quality of the barrier foam bubbles is high. The ratio of gas to solution used to create the barrier foam bubbles is proportional such that small bubbles with thick bubble walls are created. Such barrier foam bubbles have the size and mobility to move through the porous formation once formed and collectively settle at the CO2/crude oil interface. However, collectively, the barrier foam bubbles upon forming a foam barrier do not have so much mobility to collectively be pushed aside by super/critical CO2 attempting to bypass, especially through zones of high fluid conductivity, such as heterogeneous structures. In such a configuration, the foam barrier acts as layered physical barrier to the super/critical CO2. The foam barrier must be "pushed" against by the introduced CO2 and pulled by any forced production in order for the carbon dioxide to continue to advance in a downward direction. These downward motivations, in turn, further displace crude oil and provide for its production at the bottom of the reservoir.

The proposed method involves the introduction of small pore volumes of surfactant solution followed by a foaming gas. The barrier foam bubbles that form are comprised of a foaming gas that has diminished solubility in aqueous solutions as compared with other gases, such as carbon dioxide. By using a gas that does not have great solubility in water as part of generating the barrier foam bubbles, the resiliency of the barrier foam bubbles and the resultant foam barrier is improved. Barrier foam bubbles tend to become weaker as the solubility of a gas increases in the aqueous phase because the drainage rate from the bubble wall increases. By using gases like nitrogen, methane, or flue gas, however, this drainage rate is reduced and the barrier foam bubbles remain stable for a longer duration that if other foaming gases were used.

In addition, the foaming gases used also have low solubility in crude oil as compared with other gases, such as carbon dioxide. Super/critical carbon dioxide is used in the treatment due to its solubility—its ability at super/critical conditions to cause crude oil to swell, mobilize, dissolve, and have its viscosity significantly reduced, especially high-molecular weight hydrocarbons, such as paraffin waxes, maltenes, and asphaltenes. By not using a gas that has significant solubility in crude oil, the diffusion of the foaming gas through the foam wall into the crude oil is reduced. This maintains the size of the bubbles and prevents the foam barrier from thinning out or collapsing.

After forming a foam barrier along the CO2/crude oil interface and mitigating high conductivity zones with the foam barrier, carbon dioxide may then be introduced at an injection rate that is greater than the critical gas injection rate of the reservoir before start of the treatment ("pre-treatment"). After establishment of the foam barrier and clogging of the high-connectivity zones, there is little concern of viscous fingering and CO2 bypass due to excess CO2 introduction rates. The greater-than-critical gas injection rate may drive the foam barrier downwards towards the recovery wellbore at a fluid flow rate that is greater than without the foam barrier. The crude oil at the bottom of the reservoir may be driven into the recovery wellbore at a greater flow rate than possible, that is, higher than the pre-treatment critical gas injection rate than without the foam barrier.

The pressure of the CO2 cap is such that super/critical CO2 is present above the foam barrier. The pressure of the CO2 cap assists in "seating" the barrier foam bubbles into high fluid conductivity channels and at the CO2/crude oil interface. This is due to the general compressibility that still exists in the CO2 cap whereas the hydrocarbons and formation water are generally incompressible. As additional CO2 is introduced, the CO2 cap expands against the fluids in the lower portion of the reservoir. Any residual crude oil remaining in the treatment zone of the reservoir is exposed to the super/critical CO2, which solvates or otherwise motivates such hydrocarbons to flow. Highly polar organics, such as aromatics, naphthalenes, and asphaltenes, are mobilized by contact with the super/critical CO2 in the CO2 cap as the CO2 cap moves downward. The newly motivated hydrocarbons are swept and carried toward the production well by the downward-advancing CO2/crude oil/barrier foam.

The use of a foam barrier with a high-quality barrier foam bubbles that prevents bypass, the use of foaming gases that are not highly soluble in either water or crude oil, super/critical pressure of the carbon dioxide, and a greater than pre-treatment critical gas injection rate for the carbon dioxide result in three notable effects. First, an increased rate of natural gravity drainage occurs due to more crude oil being effectively exposed to carbon dioxide. This occurs not only by preventing bypass of undertreated areas but also prolonged and continuous exposure to carbon dioxide in the CO2 cap. Second, an increased rate of forced drainage occurs due to the greater rate of crude oil displacement. This is caused by the greater fluid introduction flow rate of CO2. Third, an overall improved quality of reservoir treatment occurs. As previously described, areas that are commonly bypassed or undertreated due to heterogeneities are exposed for prolonged periods to super/critical carbon dioxide, causing mobilization of even the least soluble hydrocarbons. The sum of all three improvements results in increased overall hydrocarbon production compared to without the foam barrier.

FIG. 1A is a diagram that illustrates a well environment with a treatment system in accordance with one or more embodiments. Well environment 1000 include surface 100, which represents the surface of the earth. Surface 1002 may be located above water, under water, or under ice. Below surface 1002 is the subsurface 1004, comprised generally of three areas in descending depth: overburden 1006, reservoir or hydrocarbon-bearing formation 1008, and underburden or basement 1010. Each portion of the subsurface (overburden, reservoir, and underburden) may comprise one or more layers of formation materials. There is an interface or boundary 1007, 1009 between each of the overburden and the reservoir and the reservoir and the underburden, respectively. If the overburden 1006 and the underburden 1010 comprise more than one layer of formation material, the formation material adjacent to the reservoir 1008 is considered impermeable for the purposes of this application. "Impermeable" means that the formation does not have permeability or other defects (fractures, faults) that permit hydrocarbons to move from the reservoir through either of the adjacent layers.

Reservoir 1008 has several aspects of note. Reservoir 1008 as shown does not have perfect continuity; it is not homogeneous. Reservoir 1008 has several areas of high conductivity 1012. "High conductivity" means that if a fluid, such as water or hydrocarbons, are motivated then they may flow through such portions of the reservoir more easily and at greater flow rates than other parts of the reservoir. A specific example of an area of high conductivity is a fracture or fault 1014 in the reservoir. Areas of high conductivity 1012 may have a direction of drainage (arrows 1018) based upon a single or series of areas in fluid communication or connection towards a recovery well 130.

Accelerated drainage of crude oil from the reservoir due to heterogeneity is often looked upon favorably early in the production cycle—hydrocarbons that flow easily or are otherwise highly mobile are recoverable with relatively minimal effort. However, in later phases of recovery, the heterogeneous nature of the formation may create difficulty in attempting to uniformly apply treatments to the reservoir.

As with all reservoirs, the force of gravity may provide a natural force for hydrocarbon drainage in a downward direction (arrow 1016). The combination of areas of high conductivity 1012 and the downward direction of hydrocarbon drainage 1016 may work together to cause motivated hydrocarbons to flow towards recovery well 130 if there is a means for removing such hydrocarbons from the reservoir upon reaching the recovery well 130.

Well environment 1000 in FIG. 1A is shown with a well injection system 100. Well injection system 100 includes first injection well 102. First injection well 102 includes an injection gas source 104 coupled to valve tree 105. Valve tree 105 selectively permits fluid flow to and from the first injection wellbore 106, which is defined by wellbore wall 108. First injection wellbore 106 fluidly connects the upper portion of reservoir 1008 with the surface 1002 by traversing through the entire overburden 1006 and past the overburden-reservoir boundary 1007. First injection wellbore 106 provides fluid connectivity with the surface 1002 through a series of perforations 110 in the portion of the wellbore wall 108 positioned in the upper portion of reservoir 1008.

Well injection system 100 includes second injection well 120. For the sake of clarity, not all the same features as shown for first injection well 102 are shown or described with second injection well 120; however, one may assume that second injection well (and other injection wells) are essentially the same or similar in configuration and operation.

Well injection system 100 also includes recovery well 130. The recovery well 130 is shown in FIG. 1A as being horizontal. Recovery well 130 is shown with several perforations 132 along an upward directed surface. The perforations 132 permits the recovery well 130 to receive hydrocarbons that drain from the reservoir 1008 by either natural forces, artificial processes, or combinations thereof. Recovery well 130 is positioned in the lower portion of the reservoir 1008, such as just above the underburden-reservoir interface 1009.

FIG. 1B is a diagram that illustrates a well environment during initial treatment in accordance with one or more embodiments. Well environment 1000 is shown undergoing an optional initial treatment. An initial treatment 202 (arrows) is being introduced into the upper portion of the reservoir 1008 near the interface 1007 with overburden 1006. As a result of the treatment, a treated portion of the reservoir or treatment zone 1020 forms in the reservoir 1008 that is lean of mobile hydrocarbons. Below the treated portion of the reservoir remains a portion of the reservoir 1008 that is has yet to be treated: the untreated portion of the reservoir 1021. Hydrocarbons that have been mobilized by the initial treatment 202 have moved generally downward in the reservoir 1008, driving hydrocarbons out of the bottom of the reservoir 1008 through recovery well 130 by drainage 1022 (curved arrows). Drained hydrocarbons are produced.

Several other aspects during the optional initial treatment may be observed in FIG. 1B. A treatment front 204 demarcates generally an interface between the initial treatment fluid and the remaining crude oil and other fluids (for example, formation brine) that remain untreated in the reservoir 1008. The treatment front 204 is shown as a relatively smooth curve except where there are areas of high conductivity 1012, such as fracture or fault 1014. At fault 1014, the treatment front is shown expanded downward (204A) alongside fault 1014 and in the direction of drainage 1018. A second portion of the treatment front 204 downwardly expands (204B) around another area of high conductivity 1012. These two deviations in the otherwise uniform treatment front 204 represent where initial treatment 202 has followed an area of high conductivity 1012 downward towards recovery well 130. If continued, the initial treatment would have likely continued downward and eventually broken through to the recovery well along these areas of high conductivity. This would have resulted in portions of the reservoir not being fully or being treated at all.

A new process to mitigate the zones of high conductivity and to produce hydrocarbons more evenly from the reservoir may be initiated. A review of FIG. 1B may also allow an appreciation of the scope of what may be termed the "treatment zone". The treatment zone (also may be called the "treatment volume") is the portion or volume of the reservoir that is being treated by treatment process, such as by the methods of the one or more embodiments or by a pre-treatment or initial treatment process. In FIG. 1B, the treatment zone 1020 is the treated portion of the reservoir 1008, which sits above most of the untreated portion of the reservoir 1021, treated by the initial or pre-treatment.

A treatment zone may be determined or estimated for determining the amount of a fluid to utilize for treating a portion of or an entire reservoir. For example, if one injection well is utilized, such as first injection well system 102 of FIGS. 1A-D, then a treatment zone may comprise a volume of the reservoir (1008) that is approximately cylindrical volume, where the "top" of such a cylinder may by proximate to the perforations 110 of the wellbore 106. Such a volume may have a radius extending normally outward from the position and orientation of the wellbore in the reservoir, such as where the first injection well is located and directed approximately horizontally through the reservoir. The height of the cylinder may be the thickness of the reservoir itself, extending downward towards the interface 1009 in the lower portion of the reservoir 1008. With the configuration of the well environment 1000, this is logical as there is a recovery well 130 proximate to the lower portion of the reservoir, thereby extending the height of treatment the upper part to the lower part of the reservoir (otherwise appreciated as the "thickness" of the reservoir).

As a person of ordinary skill appreciates variations in reservoir configuration, porosity, permeability, heterogeneity and other known (and potentially unknown but predictable) non-conformities, fluid(s) utilized for performing a treatment and their interaction with reservoir fluids, the behavior of such fluids under reservoir conditions, and many other factors that may have an impact on the estimation, approximation, or determination of the volume, shape, or both of a treatment zone in a reservoir. As such, one of ordinary skill in the art would be able to determine using formation management techniques what the approximate treatment zone of the reservoir may be. For example, a treatment zone such as previously described may be more conical in shape, where the tip of the cone is at the injection wellbore and the treatment volume expands in shape downward. In another instance, a treatment zone may be a very limited volume of the reservoir proximate to where the treatment fluid is introduced due to low permeability or low introduction pressure of the treatment fluid.

As one of skill in the art may already recognize, the treatment zone for a pre-treatment or initial treatment may be a different volume than the treatment zone for one or more embodiment treatments. In one or more embodiments, an initial or pre-treatment may only treat a small fraction of a reservoir (a pre-treatment or initial treatment zone), whereas the one or more embodiments may treat a larger portion or an entire reservoir volume, which may be much more encompassing than the pre-treatment or initial treatment zone. In one or more embodiments, an initial or pre-treatment zone may encompass the entire reservoir. For example, water or gas sweeps are often assumed and the amounts utilized are to encompass the entire reservoir.

Figure 1C:
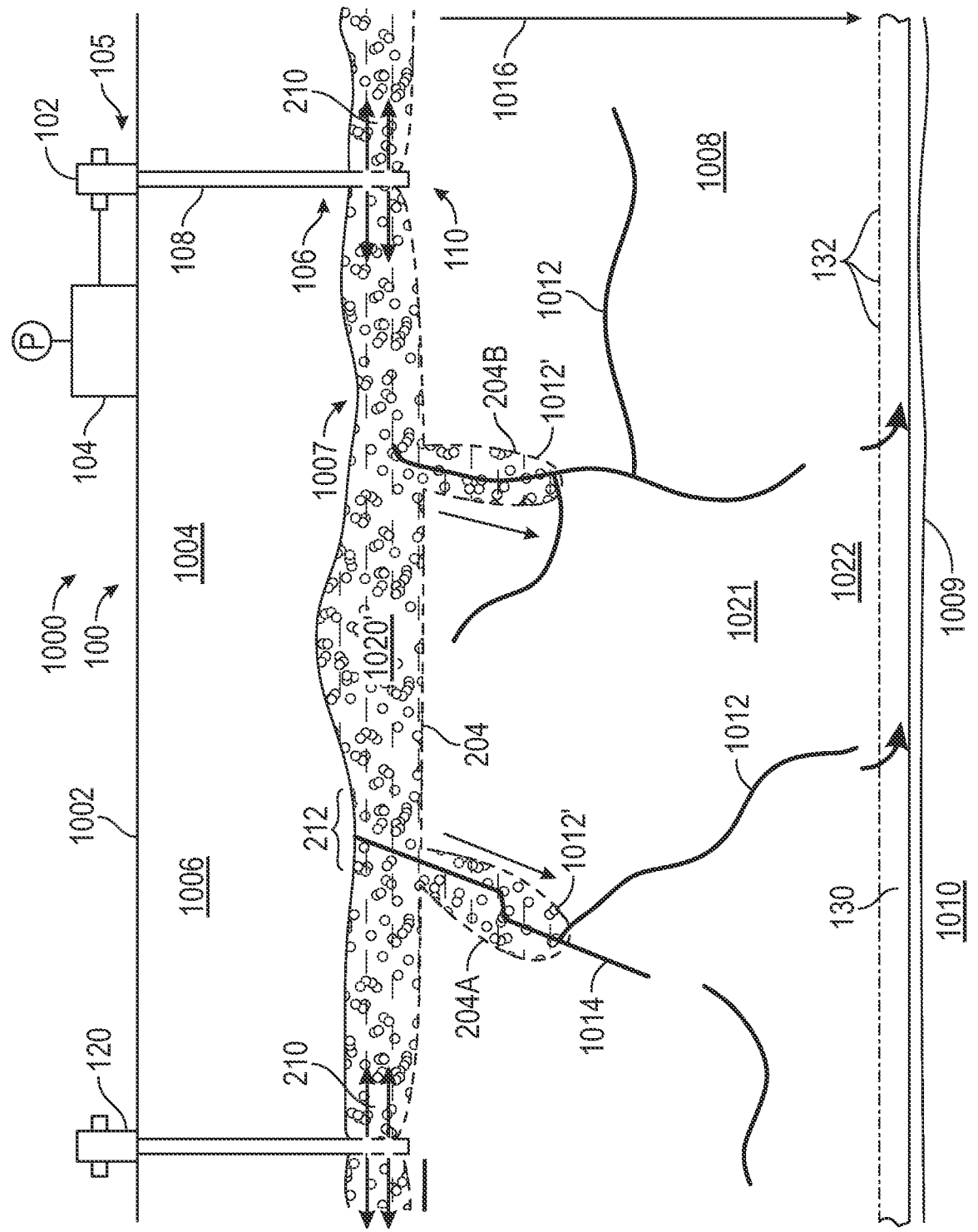
FIG. 1C is a diagram that illustrates a well environment during foam treatment in accordance with one or more embodiments.

In instances where two or more injection wells are utilized, such as presented in FIGS. 1, individual treatment zones of two or more injection wells may overlap to form a continuous treatment zone between the injection wells. For example, in FIG. 1B, it is shown that the treatment zone 1020 appears at least continuous between the first and second injection wells 102, 120. This may reflect any one or more effects occurring simultaneously. There may be high heterogeneity in the upper portion of the reservoir that permits fluid communication between the two injection well systems. There is fault/fracture 1014 and an area of high conductivity 1012 shown in FIG. 1B that may facilitate interaction between of two different treatment zones of two different injection wells. The opposite may also be true: there may be high homogeneity below the upper portion of the treatment zone such that the treatment from the two different yet adjacent injection wells are directed towards one another—the treatment is initially prevented from descending deeper into the reservoir due to resistance. Alternatively, the volume of the treatment may be sufficient to the normal of the injection wellbore such that that the radii of the treatment zones of the two adjacent injection wells overlap. In an instance, so much initial treatment 202 or foam treatment 210 (shown in FIG. 1C) may be provided that the radii of the treatment zones naturally overlap while also expanding downward through the reservoir 1008. Other treatment programs or designs are envisioned by one of ordinary skill in the art such that there is fluid communication between and among a plurality of injection wells in treating a reservoir.

Any initial or pre-treatment treatment is optional. One or more embodiments do not require an initial treatment to form a treated portion of the reservoir or to produce hydrocarbons before the method is applied to the reservoir. The one or more embodiments may be applied to a virgin (that is, unproduced) or a previously untreated (that is, not secondary or tertiary recovery) portions of a producing reservoir.

FIG. 1C is a diagram that illustrates a well environment during treatment in accordance with one or more embodiments. In well environment 1000, a treatment 210 is introduced into the treatment zone 1020'. The treated portion of the reservoir 1020' is shown filled with barrier foam bubbles 212. The barrier foam bubbles 212 form from the intimate intermixing of the components of the treatment 210 while in the matrix of the reservoir 1008. The specifics of the foam treatment components will be described forthcoming.

One aspect of the barrier foam bubbles is that once the barrier foam bubbles begin to form, they are small and dense enough to flow through the porous network of the reservoir matrix material. As individual bubbles with the aqueous solution and with formation fluids, the barrier foam bubbles flow into the portions of the reservoir that has been previously treated and that have naturally high conductivity, such as the portions of areas of high conductivity 1012 and the portions of a fracture or fault 1014 associated with expanded treatment front 204A and 204B, respectively.

In FIG. 1C, the barrier foam bubbles 212 settle due to gravity, density, and buoyancy differences between the carbon dioxide and the untreated formation fluids along treatment front 204, including in expanded treatment fronts 204A, 204B. The barrier foam bubbles 212 forms a seal between the treatment zone 1020' and the untreated portion of the reservoir 1021. As well, the barrier foam bubbles 212 also start flowing into and aggregating in high-conductivity flow routes, such as high conductivity zones 1012, 1014.

The barrier foam bubbles once they aggregate in an area where they can no longer migrate, such as the fluid interface between the volume of the reservoir that has been treated and the volume of the reservoir that has not been treated (treatment front 204 in FIG. 1C), the barrier foam bubbles tend to merge, forming larger bubbles, or share lamellae or foam bubble walls, or both, which reduces the surface tension of the bubbles. This increases stability but also hinders further mobility. From such actions, a physical barrier to fluids called a foam barrier forms from the aggregation of barrier foam bubbles.

FIG. 1D is a diagram that illustrates a well environment during CO2 treatment in accordance with one or more embodiments. Treated portion of the reservoir 1020" has visibly increased in volume while untreated portion of the reservoir 1021' has decreased. The increase in treatment volume is due to the introduction of a CO2 treatment 220 from the first and second injection well systems 102, 120. The introduction of the CO2 treatment 220 results in the formation of a CO2 super/critical cap 222 in the upper portion of the reservoir 1008, specifically in the treatment zone 1020". The specifics of the CO2 treatment components and the CO2 super/critical cap conditions will be described forthcoming.

The barrier foam is configured to mitigate further fluid access through the areas of high conductivity 1012, 1014. Drainage through the areas where the barrier has formed is now blocked (arrow with X). Little or no fluid flows through the blocked zones 2012'.

As more hydrocarbons are recovered via recovery well 130 and more CO2 is introduced to displace the produced hydrocarbon volume, the CO2 super/critical cap 222 expand generally towards the recovery well 130. As the treated and untreated volumes of the reservoir 1020", 1021', respectively, change, so does the treatment front 204', which generally moves downwards (arrows) towards the recovery well 130.

As can be seen in FIG. 1D, foam barrier 224 has formed along treatment front 204'. Foam barrier 224 has also formed along portions of the expanded treatment fronts 204A', 204B', and has blocked flow through any former areas of high conductivity 1012' (arrow with X) along those expanded treatment fronts 204A', 204B'. The foam barrier 224 prevents blocked areas of high conductivity 1012' from conducting CO2 treatment away from the expanding CO2 cap 222.

As the CO2 cap 222 continues to expand, hydrocarbons continue to drain 1022 into recovery well 130. Hydrocarbons that were not previously mobilized in the treatment zone 1020" are now exposed to super/critical carbon dioxide for a prolonged period. Such hydrocarbons swell, their viscosity is reduced, and at least in part solvate, in the super/critical carbon dioxide. These treated hydrocarbons begin to drain towards the recovery well 130.

As may be envisioned by FIG. 1D, the treatment process continues with the continued introduction of CO2 treatment fluid into the reservoir. The foam barrier prevents CO2 from bypassing through high conductivity zones and allows the treatment fluid to fully saturate the reservoir above the foam barrier, giving the best chance at recovering hydrocarbons from low-permeability portions of the formation, portions of the formation that have been or are typically bypassed by secondary or tertiary treatments, and to solvate or lower the viscosity of high-molecular weight or low mobility hydrocarbons. Given that the previously high conductivity channels and portions of the reservoir are now mitigated from permitting fluid flow by the barrier foam, the CO2 injection rate into the reservoir may be at a volume rate that is greater than what would have been the pre-treatment critical injection rate of the reservoir.

Figure 2:
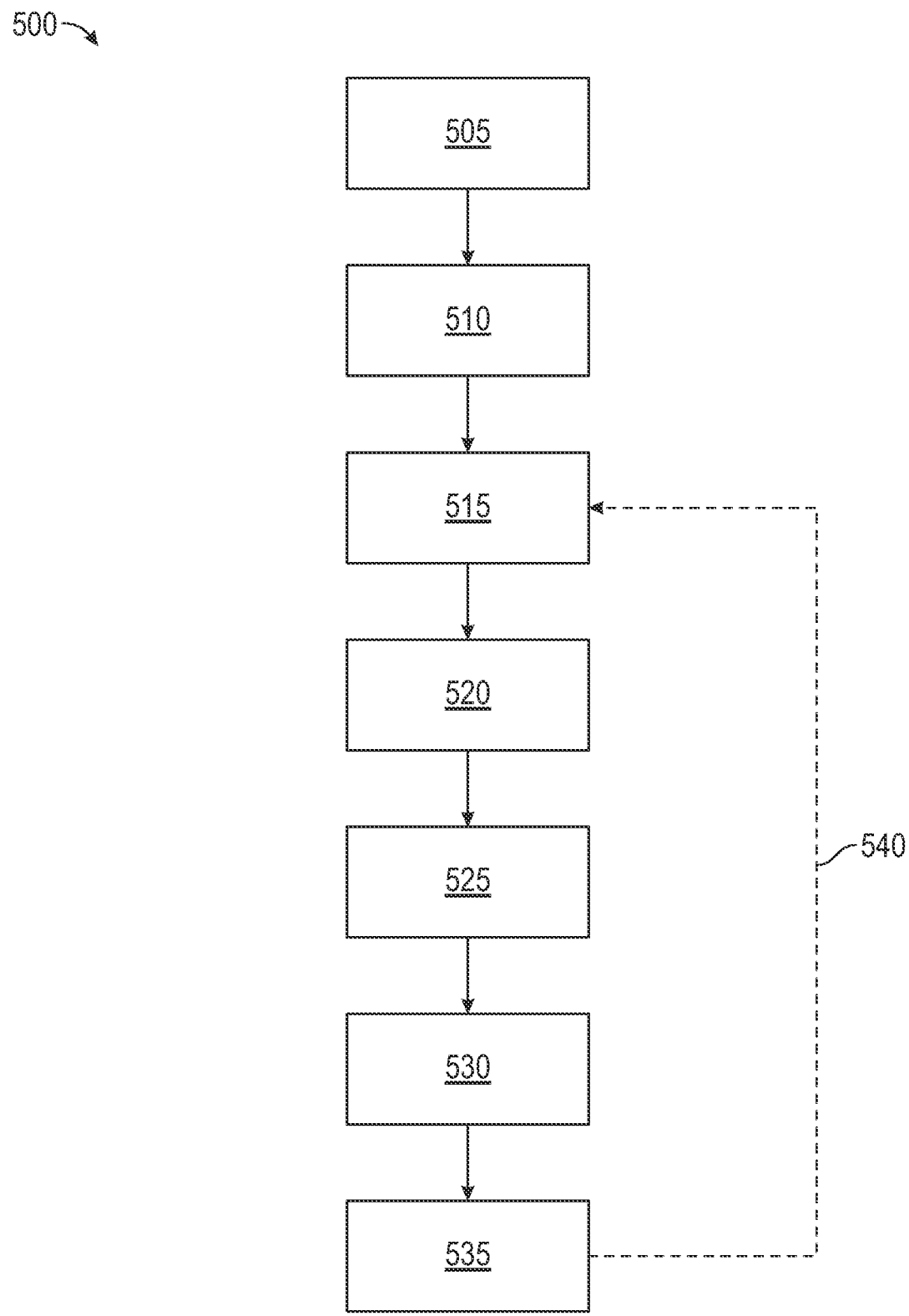
FIG. 2 is a flowchart that illustrates a method of well environment treatment in accordance with one or more embodiments.

FIG. 2 is a flowchart that illustrates a method of treating a well environment in accordance with one or more embodiments. The method of treating a well environment occurs with a system of well structures associated with recovery of hydrocarbons from a reservoir.

The well system includes an injection well, such as a pair of injection wells, in fluid communication with the reservoir to be treated. In one or more embodiments, an array of injection wells may be present, which may include a plurality of injection wells with surface couplings arranged in a regular pattern or in an irregular distribution. A given pair of injection wells are often spaced some distance from one another to provide maximum coverage for a treated reservoir. In one or more embodiments, a pair of injection wells may be spaced in a range of from about 250 to 2000 meters apart from one another as measured along the surface. The subterranean configuration of an injection well may be vertical, approximately vertical, deviated, approximately horizontal, horizontal, multilateral, multi-level, and combinations thereof.

In one or more embodiments, an injection well is in fluid communication with a reservoir. In FIG. 1A, the perforations 110 of each injection well 102, 120 are shown proximate to the interface 1007, but this is not required. In such embodiments, the optional initial treatment and the foam treatment may be introduced into an upper portion of the reservoir where the CO2 cap may form. Such positioning of the perforations limits the amount of upward migration the treatments make to reach the upper-most portion of the reservoir—the interface with the overburden—and make each treatment more effective. However, the configuration of the injection wells and the injection locations within the reservoir may vary. Given that this treatment may be done to a reservoir that has been previously produced, and that some prior production wells may be converted into injection wells, the configuration of the injection wells between any pair of wells may vary.

The well system also includes a recovery well in fluid communication with the reservoir to be treated. In some instances, the number of injection wells associated with a recovery well may be in a range of from 1 to 4, such as 2 to 4. Factors that may impact the number of injection wells may include, but are not limited to, distance between the injection wells and the recovery well. In one or more embodiments, an array of recovery wells is present. Each recovery well is in fluid communication with each injection wells such that fluid may be communicated through the reservoir from each injection well to each recovery well. The subterranean configuration of a recovery wells may be vertical, approximately vertical, deviated, approximately horizontal, horizontal, multilateral, multi-level, and combinations thereof.

In one or more embodiments, a recovery well is in fluid communication with a reservoir. In FIG. 1A, the perforations 132 of the recovery well 130 are shown proximate to the interface 1009. The perforations are directed in an upward direction to support drainage of hydrocarbons that pool on top of the underburden 1010. Such positioning of the perforations limits the amount of hydrocarbons that do not get treated by the treatments before CO2 breakthrough occurs. However, the configuration of the recovery well and the recovery location within the reservoir may vary.

In one or more embodiments, the method includes introducing an initial or pre-treatment into the reservoir. Method 500 of FIG. 5 shows that an initial treatment is introduced into the reservoir 505.

As previously described, an initial or pre-treatment of the reservoir is optional. The one or more embodiments may be applied to a virgin/untapped reservoir or an untreated or unproduced portion of a larger reservoir. The reservoir may have already undergone some sort of primary, secondary, tertiary (enhanced or improved), or a combination thereof, recovery before application of the one or more embodiments.

In an instance where an initial or pre-treatment is applied, a number of options are available. In one or more embodiments, the initial treatment applied to the reservoir is a water flood. In one or more embodiments, the initial treatment applied to the reservoir is a surfactant flood. In one or more embodiments, the initial treatment applied to the reservoir is a polymer flood. In one or more embodiments, the initial treatment applied to the reservoir is a carbon dioxide flood. In one or more embodiments, the initial treatment applied to the reservoir is a water-alternating-gas (WAG) flood. In one or more embodiments, the initial treatment applied to the reservoir is a surfactant-alternating-gas (SAG) flood. Other initial treatments of the reservoir are known to those of skill in the art.

In such instances of an initial or pre-treatment, the location of such treatment within the reservoir is not limited. An initial or pre-treatment may be applied to part or all of the reservoir. As part of an optional initial treatment, a treated portion of a reservoir may form in only the upper portion of the reservoir, such as the treatment zone 1020 of FIG. 1B. In one or more embodiments, the treated portion of the reservoir is in a range of from about 10% to about 50% of the pore volume of the reservoir. For example, the treatment may encompass the upper portion of the reservoir, such as in a range of from about the upper 10% to the upper 50% of the pore volume of the reservoir. Such an initial or pre-treatment of a portion of the reservoir, such as the upper portion of the reservoir, may displace liquid hydrocarbons, facilitate barrier foam bubble formation, or change the wetness of the formation matrix, or some or all of these. The treatment zone has substantially less liquid hydrocarbons in place than the untreated portion of the reservoir. The omission of liquid hydrocarbons may permit the formation of an associated gas cap (gas escaping from the remaining crude oil in the formation), a carbon dioxide gas cap, or a methane gas cap to occupy at least part of the treated space. Permitting mobile, compressible gases to occupy the upper portion of the reservoir before introduction of the foaming surfactant solution may make the formation of the barrier foam less energy-intensive and permit plenty of the room for the barrier foam bubbles to form.

In one or more embodiments, the initial treatment applied to the reservoir includes introducing a sacrificial surfactant fluid comprising a sacrificial surfactant in an aqueous solution. The sacrificial surfactant fluid may be introduced such that it contacts the reservoir material with the sacrificial surfactant that absorbs into the formation surface. By absorbing into the reservoir material, the reservoir surface is deactivated from absorbing any additional surfactant—either additional sacrificial surfactant or another like surfactant, such as the foaming surfactant. Minimizing absorption losses of the surfactant used to foam the barrier foam may benefit the one or more embodiments by preventing defoaming.

In such an instance, an amount of the sacrificial surfactant fluid introduced into the reservoir in such an initial or pre-treatment may be in a range of from about 0.1 to 0.5 pore volumes (PVs) of a treatment zone in the reservoir. The "pore volume" is the typically the ratio of void volume to the total volume of the porous materials, where the void volume represents not only porous spaces and connectivity between but also other heterogeneities, including vugs, fractures, and faults. Estimating, determining, or approximating the pore volume for a given treatment zone of the reservoir is on a case by case basis, and may utilize reservoir or like formation samples as well as computer models and experience. Techniques for approximating pore volume for a reservoir volume to be treated are well established in the industry for those of ordinary skill in the art of formation treatment and production management.

In one or more embodiments, the initial treatment applied to the reservoir includes introducing a low salinity injection water comprising a salt in an aqueous solution. In some instances, the salinity is less than a formation brine. In some instances, the salinity may be less than that of seawater, where the salinity is less than that of seawater, that is, less than 37,000 total dissolved solids (TDS). Such synthetic seawater or synthetic brines may have a combination of salts that produce ions that are not found in natural seawater or formation brine. The salts selected may modify the surface chemistry of the reservoir matrix, such as by making the matrix material go from oil-wet to water-wet. An example of such a useful synthetic seawater or brine is provided in U.S. Pat. No. 8,550,164 (Al-Yousef, et al.; assigned to Saudi Arabian Oil Co.), the contents of which are incorporated by reference in its entirety.

In such an instance, an amount of low salinity injection water introduced into the reservoir in such an initial or pre-treatment may be in a range of from about 0.1 to 0.5 pore volumes of a treatment zone in the reservoir.

In one or more embodiments, the method may include determining a pre-treatment critical gas injection rate value for the reservoir. Method 500 of FIG. 5 shows that the pre-treatment critical gas injection rate value may be determined for the reservoir before it is treated 510. However, in one or more embodiments, the determination may be made at any time. The estimation, approximation, or determination is based upon the characteristic of the formation and the fluids before introduction of the carbon dioxide, and upon knowledge and experience of one of ordinary skill in the art. The determination of the pre-treatment critical gas injection rate is performed as if no foaming surfactant solution or forming gas are introduced into the reservoir before the carbon dioxide introduction. In one or more embodiments, the determination of the pre-treatment critical gas injection rate for the reservoir is made on the after an initial or pre-treatment is applied. A pre-treatment or initial treatment, which may have included some hydrocarbon production, may have modified the permeability or porosity of the reservoir, including decreasing the potential critical gas injection rate for the formation by exposing highly conductive channels during the initial or pre-treatment.

In optionally estimating, approximating, or determining a pre-treatment critical gas injection rate for a reservoir, several parameters may be useful, including, but not limited to, the oil (viscosity, gas viscosity, the density difference between the hydrocarbons fluids and the super/critical carbon dioxide, and the formation permeability. "Oil viscosity" in this case refers to all in-situ hydrocarbon fluids and their aggregate fluid viscosity, including any dissolved gases. "Gas viscosity" in this instance refers to super/critical $CO_2$ viscosity. The one or more embodiment treatment processes are intended to mitigate high permeability channels and fractures to prevent early super/critical CO2 breakthrough as well as evenness of application of the sweeping fluid. Once the foaming surfactant solution and foaming gases are introduced and the barrier foam bubbles begin to form and migrate, to the barrier foam bubbles should block by the formation of the foam barrier any high conductivity fluid pathways exposed.

The critical gas injection rate value is inversely related to formation permeability. Mitigating the high conductivity channels throughout the reservoir immediately reduces the overall permeability value of the reservoir. This, in turn, should increase potential any estimate, determination, or approximation of what the critical gas injection rate value is for the reservoir from what it was before treatment.

Although not wanting to be bound by theory, it is believed that the one or more embodiment methods may reduce the overall permeability of a treated formation in a range of from about 5% to 50%. Therefore, a critical gas injection rate for a treated reservoir is in a range of from about 5% to 50% greater versus the pre-treatment critical gas injection rate value for the reservoir. In one or more embodiments, the critical gas injection rate value is greater than the pre-treatment critical gas injection rate value for the reservoir by a factor in a range of from about 1.05 to about 1.50. The treatment fluid injection rate value, which for one or more embodiments is super/critical carbon dioxide, is commonly expressed in units of thousand standard cubic feet per day (MSCF/day).

In one or more embodiments, the method includes introducing an amount of a foaming surfactant solution into an upper portion of the reservoir. Method 500 of FIG. 5 shows that a foaming surfactant solution is introduced into the upper portion of the reservoir 515. The upper portion of the reservoir is proximate to the upper boundary between the overburden and the reservoir, such as boundary 1007 of FIGS. 1A-D.

In one or more embodiments, the foaming surfactant solution is an aqueous solution comprising water. Water may comprise one or more known compositions of water, including distilled; condensed; filtered or unfiltered fresh surface or subterranean waters, such as water sourced from lakes, rivers or aquifers; mineral waters; gray, brown, black, and blue waters; run-off, storm or waste water; potable or non-potable waters; brackish waters; synthetic or natural sea waters; synthetic or natural brines; formation waters; production water; boiler feed water; condensate water; and combinations thereof. The water may include impurities, including, but not limited to, ions, salts, minerals, polymers, organic chemicals, inorganic chemicals, detritus, flotsam, debris, and dead and living biological life forms, so long as the purpose and performance of the surfactant solution is not mitigated or otherwise detrimentally affected.

In one or more embodiments, the foaming surfactant solution further comprises a foaming surfactant. Several factors that may influence the selection of a foaming surfactant may include, but are not limited to, salinity of the formation/connate water in the reservoir, the reservoir temperature, and formation material (for example, sandstone and carbonate).

In one or more embodiments, the foaming surfactant includes an anionic surfactant. The anionic surfactant may include, but is not limited to, alpha olefin sulfonates, internal olefin sulfonates, and combinations thereof. Other useful anionic surfactants include, but are not limited to, sodium dodecyl benzene sulfonate, ammonium ether sulfate, sodium decyl sulfate, sodium laureth sulfate, and combinations thereof. Sulfonate-based surfactants may withstand high reservoir temperatures (equal to or greater than 100° C.) and can show tolerance to high salinities. Some surfactants do not exhibit surface action when there are ionic species such as dissolved salts in an aqueous solution; therefore, performance in aqueous solutions with salts is desirable. Sulfonate-based surfactants also only moderately absorb into carbonate-based formation, thereby not causing extensive bubble degradation. An example useful alpha olefin sulfonate (AOS) demonstrates suitability as a foaming surfactant with a foam half-life of 16.0 hours in high-salinity water (57,670 ppm (parts per million) total dissolved solids (TDS)). The example alpha olefine sulfonate also demonstrates a non-excessive level of adsorption into carbonate formation material. Useful AOS surfactants may contain linear, primary alkyl functionality with a monovalent associated cation.

In one or more embodiments, the foaming surfactant includes a non-ionic surfactant. The non-ionic surfactant may include, but is not limited to, alcohol ethoxylates. An example of a useful alcohol ethoxylate is a mixture of C12-15 alcohols having an average ethoxylate chain length of 12. The aforementioned alcohol ethoxylate demonstrates suitability as a foaming surfactant with a foam half-life of 22.5 hours in high-salinity water (57,670 ppm TDS), reduced adsorption into carbonate formation materials, and being thermally stable up to about 90° C.

In one or more embodiments, the foaming surfactant includes a zwitterionic or amphoteric surfactant. The zwitterionic surfactant may include, but is not limited to, alkyl amines, cocamidopropyl betaine (CAPB), and combinations thereof. Other useful zwitterionic surfactants include, but are not limited to, cocamidopropylamine oxide, lauramine oxide, and cocamidopropyl hydroxysultaine, and combinations thereof. An example useful alkyl amine-based amphoteric surfactant demonstrates suitability as a foaming surfactant with a foam half-life of 21.0 hours in high-salinity water (57,670 ppm TDS) at high temperatures (equal to or greater than 100° C.). An example zwitterionic surfactant includes a useful CAPB that demonstrates suitability as a foaming surfactant with a foam half-life of 22.0 hours in high-salinity water (57,670 ppm TDS), with low adsorption into carbonate formation materials.

The foam half-life in testing conditions is shown to be in the range of a few hours to a few days. Although not wanting to be bound by theory, in a porous media, such as the reservoir matrix, the movement of the fluids will continually regenerate and form barrier foam bubbles. In turn, the barrier foam bubbles and therefore the foam barrier will continuously regenerate as long as there is sufficient foaming surfactant solution present while the treatment front moves further down inside the reservoir.

The foaming surfactant may be present in a concentration in the foaming surfactant solution in a range of from about 0.05 to 5.0 wt. % (weight percent). In one or more embodiments, the foaming surfactant is present in a concentration in the foaming surfactant solution having a lower limit of one of 0.05, 0.1, 0.2, 0.3, 0.5, 0.7, 1.0, 1.5, 2.0, 2.5, 3.0, and 3.5 wt. % and an upper limit of one of 2.0, 2.5, 3.0, 3.5, 4.0, 4.5, and 5.0 wt. %, where any lower limit may be paired with any mathematically compatible upper limit.

In one or more embodiments, a viscosifier is present in the foaming surfactant solution in a range of from greater than 0.0 to 0.05 wt. %. In such embodiments, the viscosifier is present in a concentration in the foaming surfactant solution having a lower limit of one of greater than 0.00, 0.01, 0.02, 0.03, and 0.04 wt. % and an upper limit of one of 0.01, 0.02, 0.03, 0.04, and 0.05 wt. %, where any lower limit may be paired with any mathematically compatible upper limit. The viscosifier may be a polymer, including, but not limited to, hydrolyzed polyacrylamides, sulfonated polyacrylamides, and combinations thereof. The viscosifer may be a nanoparticle, including, but not limited to, silica, surface modified silica, iron oxides, surface modified iron oxides, mixed metal oxide, carbon, surface-functionalized, graphene oxide, reduced graphene oxide, non-Janus functionalized graphene, and Janus functionalized graphene nanoparticles, and combinations thereof.

The amount of foaming surfactant solution introduced into the reservoir is in a range of from about 0.05 to 0.10 pore volumes (PV) of the volume of a treatment zone in the reservoir. In one or more embodiments, the amount of surfactant solution introduced into the reservoir may have a lower limit of one of 0.1, 0.2, 0.3, and 0.4 PV, and an upper limit of one of 0.2, 0.3, 0.4, and 0.5 PVs of the volume of the treatment zone, where any lower limit may be paired with any mathematically compatible upper limit.

In one or more embodiments, the method includes introducing a foaming gas into the upper portion of the reservoir. Method 500 of FIG. 5 shows that a foaming gas is introduced into upper portion of the reservoir 520.

The foaming gas in one or more embodiments should have limited or no miscibility with hydrocarbons in the reservoir at reservoir conditions. The foaming gas should not have significant miscibility with hydrocarbons at reservoir conditions, such as carbon dioxide, to prevent the foaming gas from defoaming through the bubble film into the hydrocarbons, causing deflation and degradation of the barrier foam. Combinations of gases that are useful as foaming gases include, but are not limited to, methane, nitrogen, flue gas, natural gas, and stoichiometric mixtures of methane and carbon dioxide in a range of from about 10,000:1 to 1:1. The maximum amount of $CO_2$ should be no greater than 50 mol % as this may begin to cause long-term instability to the barrier foam.

In one or more embodiments, the foaming gas comprises a refined gas. In such an embodiment, the refined gas is substantially homogeneous in nature and has a purity before introduction into the hydrocarbon bearing formation of greater than 90%, or greater than 95%, or greater than 97%, or greater than 98%, or greater than 99%, or greater than 99.9%, or greater than 99.99%. Examples of useful refined gases include, but are not limited to, nitrogen, methane, ethane, propane, n-butane, iso-butane, mixtures of butanes ("the butanes"), iso-pentane, normal pentane, mixtures of pentanes ("the pentanes"), natural gas, vaporized liquid petroleum gas (LPG), vaporized natural gas liquids (NGL) and the noble gases, such as helium and argon. Blends of refined gases may also be used. Air and oxygen-enriched gases are not typically utilized in such service.

In one or more embodiments, the foaming gas comprises a flue gas. In such an embodiment, the flue gas may originate form a natural gas-fired power plant. Such a flue gas may comprise carbon dioxide in a range of from about 8 to 10 vol. % (volume percent), from about 18 to 20 vol. % water, from about 2 to 3 vol. % oxygen, and from about 67 to 72 vol. % nitrogen. In such an embodiment, the flue gas may originate form a coal gas-fired boiler. Such a flue gas may comprise carbon dioxide in a range of from about 12 to 14 vol. %, from about 8 to 10 vol. % water, from about 3 to 5 vol. % oxygen, and from about 72 to 77 vol. % nitrogen. In one or more embodiments, the fluid gas may have a composition in a range of from about 3 to 14 vol. % carbon dioxide, from about 2 to 15 vol. % water, from 0 to about 15 vol. % oxygen, from 0 to about 1 vol. % argon, from 0 to about 1 vol. % carbon monoxide, and from about 66 to 78 vol. % nitrogen. For flue gases, greater concentrations of nitrogen and lesser concentrations of carbon dioxide are useful due to the insolvent nature of nitrogen gas with hydrocarbons.

In one or more embodiments, the foaming gas comprises a produced gas. In such an embodiment, the produced gas may be a hydrocarbon-based gas previously associated with produced crude oil that has been separated. Such a produced gas may comprise methane in a range of from about 65 to 100 vol. %, from about 0 to 7 vol. % ethane, from about 0 to 7 vol. % propane, from about 0 to 4 vol. % the butanes, from about 0 to 3 the pentanes, from 0 to about 4 vol. % hydrogen sulfide, from 0 to about 2 vol. % carbon dioxide, from about 0 to 26 vol. % nitrogen, from 0 to 2 vol. % helium, and from 0 to about 1 vol. % hydrogen. Other forms of produced gas may originate from dry gas, wet gas, and condensate-producing wells; coal beds; and landfills. Methane is a useful component of such product gases.

Other forms of hydrocarbon-based gases that may be useful as foaming gases include, but are not limited to, sales gas, refinery boiler feed gas, and cracked hydrocarbon gas. "Cracked" gases may include olefins, such as ethylene, propylene, butylene, and pentylene. Waste gas streams from coking operations and other stream that contain significant concentrations of methane or nitrogen and reduced amounts of oxygen and carbon dioxide are useful.

As part of introducing the foaming gas, the foaming gas and the foaming surfactant solution intimately intermingle within the reservoir, forming the barrier foam. In FIG. 1C, this is shown occurring in treated portion of reservoir 1020, although this is not required. The intimate intermingling within the reservoir matrix and the formation of the barrier foam bubbles may occur proximate to the interface between the reservoir and the overburden if there is no prior or initial treatment performed on the reservoir.

In one or more embodiments, the method may include introducing an amount of the foaming surfactant solution to an amount of the foaming gas such that a volume:volume ratio of foaming surfactant solution to foaming gas is in a range of from about 1:2 to 2:1, such as 1:1.

In one or more embodiment, the foam quality of the barrier foam bubbles may be in a range of from about 0.30 to 0.98, such as 0.35, 0.40, 0.45, 0.50, 0.55, 0.60, 0.65, 0.70, 0.75, 0.80, 0.85, 0.90, 0.95, 0.96, and 0.97, and values in between. "Foam quality" is the amount of foaming gas divided by the sum of the amount of foaming gas and the amount of foaming surfactant solution at a given pressure and temperature. Foam quality may be expressed as a decimal fraction (as here) or in percentage. In terms of foam quality, generally foams are characterized to be in the 1) high-quality regime (high gas content) or 2) low-quality regime (low gas content). Foam quality reflects the gas to total volume used to generate foam bubble, and that the quality of the foam rises when there is more foaming gas utilized.

Foam density is affected by foam quality. The density of the foam is the average of the density of the gas and the liquid at a given pressure and temperature. Greater foam quality means a reduced foam density since the volume of the gas comprising the foam is in much greater proportion than the liquid; lesser foam quality means relatively greater density since more liquid is present. Foam density also depends on the pressure and temperature, which will affect the compressibility of the gas fraction. In one or more embodiments, a foam density in a range of from about 0.1 to 0.9 g/cm$^3$ (grams per cubic centimeter) at formation conditions is considered useful. Foams with densities outside this range may also be useful in certain circumstances.

Foam viscosity is a measure of the foam stiffness or resistance to flow. The viscosity of a foam increases as the number of bubbles rises per unit volume. Surfactants utilized as part of the foam formulation are utilized to stabilize gas-liquid film and generate the foam. Foam viscosity is also affected by the addition of stabilizers and other foam ingredients, including but not limited to, polymers, thickeners, nanoparticles, and salts. Greater foam viscosities result in greater stability but have the side-effect of reduced foam drainage, or ability to move based upon gravity into a void. Foam viscosity is affected by formation conditions that include temperature, pressure, brine salinity, capillary forces, gas and liquid saturation, and presence of crude oil. In the absence any foam modifiers, the foam apparent viscosity at formation conditions may be in the range of from about 0.5 to 500 cP (centipoise). With viscosity modifiers, the foam apparent viscosity at formation conditions may be in the range of from about 500 to 3000 cP.

In one or more embodiments, there is no shut-in duration between the introduction of foaming gas and the introduction of carbon dioxide. Upon completion of the introduction of the foaming gas, the process proceeds immediately to the next step of introducing carbon dioxide. The purpose of not having any settlement time is to maintain flow from the formation. During introduction of the optional pre-treatment or initial treatment, the foaming surfactant solution, and the foaming gas, hydrocarbon production is maintained. This permits maintaining the pressure on the formation as new fluids are being introduced but also creates volume for the new fluids as the hydrocarbons drain towards the production wellbore.

In one or more embodiments, the method includes introducing super/critical carbon dioxide into the reservoir. Method 500 of FIG. 5 shows that super/critical carbon dioxide is introduced into the reservoir 525. The introduction of carbon dioxide occurs above the foam barrier front. By introducing super/critical carbon dioxide into the reservoir, a super/critical carbon dioxide cap forms in the upper portion of the reservoir.

In one or more embodiments, the carbon dioxide is introduced into the reservoir at a pressure at or greater than the critical pressure of carbon dioxide. The critical pressure value of carbon dioxide is about 72.8 atmospheres. At wellbore temperature conditions, the carbon dioxide introduced at or greater than critical pressure will be at super/critical condition.

In a critical or super/critical fluid state, carbon dioxide is an excellent solvent of hydrocarbons. Super/critical carbon dioxide treatment reduces the overall bulk viscosity of crude oil, dissolves into the crude oil and causes it to swell, which forces the combination out of tight pores, and also solvates the crude oil and carries it along with the fluid migration downward. Super/critical carbon dioxide also has increased polarity versus non-critical carbon dioxide. Super/critical carbon dioxide assists in mobilizing highly polar organic molecules, such as asphaltenes, aromatics, and organic compounds that contain N, S, and O heteroatoms that are double-bonded.

The super/critical carbon dioxide may be introduced into any portion of the reservoir. Due to buoyancy, any carbon dioxide introduced into the lower portion of the reservoir will migrate upwards to form the CO2 cap. Although introduction lower in the reservoir may require the CO2 to pass upward through the barrier foam, eventually the CO2 will migrate to the top of the formation due to its overall buoyancy, although the CO2 will be delayed in reaching the top of the reservoir because of having to pass through the barrier foam.

In one or more embodiments, the carbon dioxide is introduced into reservoir at a fluid flow rate at or greater than the pre-treatment critical gas injection rate. The mobility of a gas within a formation is defined by the relationship $k/\mu$, where k is the permeability of the formation and $\mu$ is the viscosity of the fluid. The treatment that forms the foam barrier mitigates any accessible high permeability channels in the reservoir before carbon dioxide is introduced; any other areas have reduced relative permeability. This treatment therefore results in the average permeability (k) of the formation being reduced. In addition, the super/critical carbon dioxide may also form barrier foam bubbles with residual surfactant solution in the reservoir. This barrier foam bubble formation of CO2 increases the average viscosity ($\mu$) value for the super/critical carbon dioxide. Both effects—the reduction of k and increase of $\mu$—reduce the mobility of carbon dioxide both within the treatment zone and overall though the reservoir. Since the mobility of the carbon dioxide is decreased, the introduction rate may be increased to a value greater than the pre-treatment critical injection rate as the super/critical carbon dioxide due to its reduced mobility is less likely to break through the foam barrier and bypass around it using high conductivity conduits. This is true even while maintaining both a stable foam barrier and steady advancement of the foam barrier front through the reservoir.

As super/critical carbon dioxide continues to be introduced and production fluid (in the form of hydrocarbons and some formation water) is produced, the increasing amount of carbon dioxide in the cap and the decreasing amount of hydrocarbons causes the foam barrier to move in a downward direction, expanding the treatment zone. The foam barrier front extends and maintains the separation between the super/critical carbon dioxide and the untreated portion of the reservoir. As reservoir hydrocarbons and other fluids move in a generally downward direction by forced drainage, gravity drainage, and improved mobility by exposure to surfactants and carbon dioxide, the newly "vacated" portion of the reservoir is occupied first by the barrier foam and then super/critical carbon dioxide.

As the barrier foam continues its downward movement following the retreating reservoir fluid, the barrier foam comes into direct contact with some portions of residual hydrocarbons that are not mobilized. Upon contact, some of the barrier foam may degrade and contribute surfactant to the hydrocarbons in place, thereby mobilizing them with formation water or other aqueous fluids. The now mobilized hydrocarbons begin to descend through the reservoir towards the recovery well.

In addition to mobilizing in-place hydrocarbons, the barrier foam also continues to seek out access to the high-conductivity zones in the newly exposed treatment zone. The barrier foam continues to migrate into high conductivity channels and blocks the newly exposed fluid flow pathways towards the recovery well. This prevents any new fluid bypass and maintaining the ability to continue to introduce carbon dioxide at a greater than pre-treatment critical gas introduction rate.

As treatment continues, for a given volume the barrier foam passes through and then the volume is continually exposed to super/critical carbon dioxide. This may be true of crude oil (or components thereof) that is directly adhered to the formation matrix, such as materials that is oil wet, that are highly viscous, or that are highly polar. Exposed hydrocarbons to super/critical carbon dioxide are thinned in a rheological manner. Such mobilized, carbon dioxide-saturated hydrocarbons, are effectively solubilized in the carbon dioxide and decouple or delayer from each other. The resultant saturated material may traverse with alacrity towards the production well. In having a significantly reduced viscosity, the mobilized hydrocarbons oil may pass between the barrier foam bubbles of the foam barrier without comprising their general ability to seal the remaining super/critical carbon dioxide from the untreated portion of the reservoir. Such increased downward mobility of carbon dioxide saturated hydrocarbons may result in increased overall production from the reservoir as amounts of thinned hydrocarbons saturated with carbon dioxide descend through untreated, highly-conductive channels remaining in the reservoir.

In one or more embodiments, the method includes maintaining the CO2 cap at a super/critical pressure. Method 500 of FIG. 5 shows that carbon dioxide cap is maintained at a super/critical pressure in the reservoir 530. Maintaining the super/critical pressure in the upper portion of the reservoir may require additional intervention into the reservoir that is beyond the scope of this application but would be appreciated by one of ordinary skill in the art.

In one or more embodiments, the method includes recovering hydrocarbons from a lower portion of the reservoir. Method 500 of FIG. 5 shows that crude oil is recovered from the lower portion of the reservoir 535. In one or more embodiments, the recovery of hydrocarbons may coincide with the initial or pre-treatment of the reservoir, such as with method step 505. In one or more embodiments, the production of hydrocarbons may coincide with the introduction of an amount of a foaming surfactant solution into an upper portion of the reservoir, such as with method step 515. In one or more embodiments the production of hydrocarbons may coincide with the introduction of an amount of the foaming gas into the upper portion of the reservoir, such as with method step 520. In some other instances, the production of hydrocarbon may coincide with the introduction of super/critical carbon dioxide into the reservoir, such as with method step 525. In one or more embodiments, the production of hydrocarbons may coincide with any or all of these processes.

In one or more embodiments, the method may loop back to introducing the foaming surfactant solution 515 using pathway 540. As contact with hydrocarbons may cause the barrier foam bubbles to degrade (as surfactant from the foam bubbles is transferred into the hydrocarbons, allowing it to mobilize with water or other aqueous solutions present), the foam barrier may be replenished or reinforced by new addition of foaming surfactant solution. As well, the expansion of the treatment zone may also require additional barrier foam bubbles to extend the foam barrier. In one or more embodiments, supplemental barrier foam bubbles may form from the combination of foaming surfactant solution and foaming gas. In one or more embodiments, supplemental barrier foam bubbles may form from the combination of foaming surfactant solution and super/critical carbon dioxide. In doing so, part of the one or more embodiments is repeated, and additional treated hydrocarbons are recovered through the recovery well. This process may be repeated until the foam barrier reaches a portions of the recovery well at which time super/critical carbon dioxide breaks though the production well.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims. Thus, particular implementations of the subject matter have been described. Other implementations are within the scope of the following claims.

Although only a few example embodiments have been described in detail, those skilled in the art will readily appreciate that many modifications are possible in the example embodiments without materially departing from the described scope. Accordingly, all such modifications are intended to be included within the scope of this disclosure as defined in the following claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph f, for any limitations of any of the claims, except for those in which the claim expressly uses the words 'means for' together with an associated function.

What is claimed:

1. A method for treating hydrocarbons in a reservoir, comprising:

determining a pre-treatment critical gas injection rate for the reservoir after introducing an initial or pre-treatment;

introducing a foaming surfactant solution into an upper portion of a reservoir, where the foaming surfactant solution comprises an aqueous solution and a foaming surfactant;

introducing a foaming gas into the upper portion of a reservoir such that the surfactant solution and the foaming gas intimately intermingle and form barrier foam bubbles in the upper portion of the reservoir;

introducing a super/critical carbon dioxide into the reservoir such that a CO2 cap forms above a foam barrier positioned at an interface between the hydrocarbons to be treated in the reservoir and the CO2 cap, where the foam barrier comprises aggregated barrier foam bubbles, and where the super/critical carbon dioxide is introduced into the reservoir at an injection rate that is greater than the pre-treatment critical gas injection rate for the reservoir; and recovering hydrocarbons from a lower portion of the reservoir.

2. The method of claim 1, where the foaming surfactant in the foaming surfactant solution is in a concentration in a range of from about 0.05 wt. % to about 5.0 wt. % (weight percent).

3. The method of claim 1, where the surfactant of the foaming surfactant solution is selected from the group consisting of an anionic surfactant, a non-ionic surfactant, a zwitterionic surfactant, and any combination thereof.

4. The method of claim 3, where the anionic surfactant is selected from the group consisting of an alpha olefin sulfonate, an internal olefin sulfonate, sodium dodecyl benzene sulfonate, ammonium ether sulfate, sodium decyl sulfate, sodium laureth sulfate, and any combination thereof.

5. The method of claim 3, where the non-ionic surfactant is selected from the group consisting of alcohol ethoxylates, an alcohol ethoxylate mixture of C12-15 alcohols having an average ethoxylate chain length of 12, and any combination thereof.

6. The method of claim 3, where the zwitterionic surfactant is selected from the group consisting of alkyl amines, cocamidopropyl betaine (CAPB), cocamidopropylamine oxide, lauramine oxide, cocamidopropyl hydroxysultaine, and any combination thereof.

7. The method of claim 1, where an amount of the surfactant solution introduced into the reservoir is in a range of about 0.05 to 0.1 pore volumes (PVs) of a treatment zone of the reservoir.

8. The method of claim 1, where the foaming gas is selected from the group consisting of methane, nitrogen, natural gas, stoichiometric mixtures of methane and carbon dioxide in a range of from about 10,000:1 to 1:1, refined gas, flue gas, produced gas, sales gas, refinery boiler feed gas, cracked hydrocarbon gas, waste gas from coking operations, and any combination thereof.

9. The method of claim 1, where an amount of the foaming gas introduced into the reservoir is in a range of about 0.05 to 0.1 pore volumes of a treatment zone of the reservoir.

10. The method of claim 1, where the volume:volume ratio of the amount of the surfactant solution to the amount of the foaming gas is in a range of from about 1:2 to 2:1.

11. The method of claim 1, where the foaming surfactant solution and the foaming gas are both introduced into the upper portion of the reservoir.

12. The method of claim 1, further comprising determining the pre-treatment critical gas injection rate for the reservoir before introducing the foaming surfactant solution.

13. The method of claim 1, where carbon dioxide is introduced into the upper portion of the reservoir.

14. The method of claim 1, further comprising maintaining the CO2 cap at a super/critical pressure.

15. The method of claim 1, where the foam quality of the barrier foam bubbles is in a range of from about 0.30 to about 0.98.

16. The method of claim 1, where the initial or pre-treatment is a sacrificial surfactant fluid comprising a sacrificial surfactant.

17. The method of claim 1, where the initial or pre-treatment is a low salinity injection water comprising a salt in an aqueous solution.

18. The method of claim 1, where an amount of the initial or pre-treatment introduced into the upper portion of the reservoir is in a range of about 0.05 to 0.1 pore volumes of a treatment zone of the reservoir.

\* \* \* \* \*